May 30, 1933.  I. GONYK  1,912,273
LUBRICATING DEVICE FOR SHAFT BEARINGS
Original Filed Feb. 7, 1929
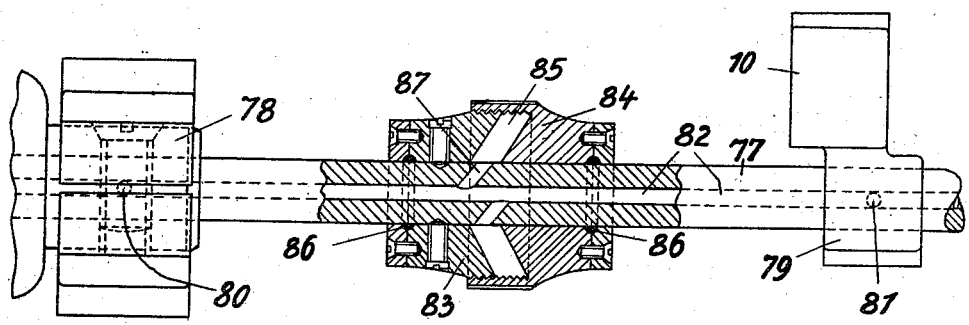
INVENTOR
*Ignatz Gonyk*
BY *Munn & Co.*
ATTORNEYS Patented May 30, 1933

1,912,273

UNITED STATES PATENT OFFICE

IGNATZ GONYK, OF VIENNA, AUSTRIA

LUBRICATING DEVICE FOR SHAFT BEARINGS

Original application filed February 7, 1929, Serial No. 338,229, and in Germany December 17, 1928. Divided and this application filed April 9, 1930. Serial No. 442,887.

My invention relates to a lubricating device for shafts more particularly for the shuttle operating shafts of sewing machines.

This is a division of my application for patent filed in the United States of America for "Sewing machine" filed February 7th, 1929, Serial No. 338,229.

The object of my invention is to provide a simple, reliable and cheap lubricating device for two or more bearings of a shaft.

With this object in view my improved lubricating device comprises two annular parts mounted on the shaft and movable relatively to each other along the said shaft. Such parts enclosing between them a chamber in permanently open connection with a longitudinal bore of the shaft such bore leading to the lubricating points, that is to say to the bearings to be lubricated.

The annexed drawing, comprising a view in elevation partly in section, shows by way of example an embodiment of my improved lubricating device in longitudinal section, the lubricating device being applied to the driving shaft for the shuttle of sewing machines.

The shaft 77 has two bearings 78, 79 with the lubricating points 80, 81 which are connected with the lubricating device located approximately in the middle of the shaft by a longitudinal bore 82 of the shaft and transverse bores 87. The lubricating device consists of two parts 83, 84 enclosing a chamber 85 for the lubricant, one of these parts, 83, is fast on the shaft while the other part 84 may be screwed on the former. These two parts carry packing rings 86 for preventing leakage of the lubricant along the shaft.

If the part 84 is further screwed on the fixed part, say by means of its knurled rim, the lubricant contained in the chamber 85 is forced through the longitudinal bore 82 of the shaft to the lubricating points 80, 81 of the bearings 78, 79.

What I claim is:

1. The combination with a shaft having a longitudinal bore and passages running from said bore to the periphery of said shaft, of supporting bearings, and a lubricating device located on said shaft between said bearings, said lubricating device comprising a member secured to said shaft, and a second member movable upon said first member and with said first member forming a chamber communicating with certain of said passages.

2. The combination with a shaft having a longitudinal bore and passages running from said bore to the periphery of said shaft, of a bearing lubricating device comprising a member secured to said shaft, and a second member movable upon said first member and with said first member forming a chamber communicating with certain of said passages, said second member, having a sliding engagement with said shaft, and a screw threaded engagement with said first member.

In testimony whereof I have affixed my signature.

IGNATZ GONYK.